United States Patent [19]

Tanaka et al.

[11] Patent Number: 4,612,068
[45] Date of Patent: Sep. 16, 1986

[54] MAGNETO-OPTICAL RECORDING MEDIUM

[75] Inventors: Shinsuke Tanaka, Kanagawa; Nobutake Imamura, Tokyo, both of Japan

[73] Assignee: Kokusai Denshin Denwa Co., Ltd., Tokyo, Japan

[21] Appl. No.: 591,538

[22] Filed: Mar. 20, 1984

[30] Foreign Application Priority Data

Mar. 29, 1983 [JP] Japan .................................. 58-051508

[51] Int. Cl.$^4$ ............................................. C22C 38/00
[52] U.S. Cl. .................... 148/301; 148/403; 420/83
[58] Field of Search ..................... 148/31.55, 403; 75/123 E

[56] References Cited

U.S. PATENT DOCUMENTS

| 4,126,494 | 11/1978 | Imamura et al. | 148/403 |
| 4,308,474 | 12/1981 | Savage et al. | 75/123 E |
| 4,374,665 | 2/1983 | Koon | 148/403 |
| 4,390,600 | 6/1983 | Ohta et al. | 428/621 |

FOREIGN PATENT DOCUMENTS

| 58-48650 | 3/1983 | Japan | 148/31.55 |
| 2071696 | 9/1981 | United Kingdom | 75/123 E |

Primary Examiner—Melvyn J. Andrews
Assistant Examiner—Deborah Yee
Attorney, Agent, or Firm—Martin Novack

[57] ABSTRACT

Amorphous thin film with easy magnetization axis perpendicular to film surface for magneto-optical recording with low recording power and high S/N in reading signal is set forth. The medium is an alloy of heavy rare earth element and iron with substitution of some heavy rare earth elements by light rare earth element, and the preferable chemical formula of the thin film is $(R_zA_{1-z})_xFe_{1-x}$, or $[(R_zA_{1-z})_yB_{1-y}]_xFe_{1-x}$ where R is a light rare earth element, A and B are heavy rare earth elements, and the atom ratios satisfy $0.15 \leq x \leq 0.35$, $0.00 < y < 1.00$, $0.00 < z < 1.00$. Recording is effected by using Curie point, or magnetic compensation temperature, and reading of information is effected by using the Kerr effect.

5 Claims, 4 Drawing Figures

MAGNETO-OPTICAL RECORDING MEDIUM

BACKGROUND OF THE INVENTION

The present invention relates to a magneto-optical recording medium for a magneto-optical memory, and/or a magnetic recording display element, in particular, relates to such a medium which is a magnetic thin film having an easy magnetization axis in the depth direction of a film, which stores information by producing reversed magnetic domain in a circular or arbitrary shape, and reading stored information by using magneto-optical effect like Kerr effect.

Ferro-magnetic thin film with an easy magnetization axis in the depth direction (which is perpendicular to a film surface) can have a small reversed magnetic domain in a uniformly magnetized film. Digital information is stored in that film when the presence and nonpresence of that reversed magnetic domain are designated to the information "1" and "0", respectively. When that ferro-magnetic film has high coercive force at room temperature, and has a Curie point or a magnetic compensation temperature close to room temperature, that film is used as a beam addressable file in which reversed magnetic domain is provided at a desired location by using an optical beam and the effect of the Curie point or the magnetic compensation temperature.

FIG. 3 shows the principle of the magneto-optical recording which is used in the present invention. In the figure, the numeral 10 is a recording medium which has an easy magnetization axis 18 in the depth direction of the film. The numeral 12 is a lens for focusing the laser beam 14. It is assumed that the film is pre-magnetized uniformly in the predetermined polarity as indicated by the numeral 18, and an external bias magnetic field 16 is applied to the film 10 so that the direction of the external field 16 is opposite to the original magnetic field 18, and the external field 16 is less than the coercive force of the film 10. Since the external field 16 is less than the coercive force, the pre-magnetized field 18 is not reversed by the external field 16. In the above situation, when the film is selectively heated by the laser beam 14, the temperature of the heated portion becomes higher than the Curie point or the magnetic compensation temperature at which the film has a very small coercive force $H_c$. Therefore, the internal magnetic field at the heated area in the film 10 coincides with the external magnetic field 16. That is to say, the internal magnetic field 18 is reversed to the reversed field 20 by illuminating (or heating) the film selectively. Thus, information is stored in the shape of a reversed magnetic domain by illuminating the film selectively.

The stored information is read by using the Kerr effect, that is to say, the surface of the film 10 is illuminated by a weak laser beam which is subject to rotate the plane of polarization according to the direction of the magnetization of the film 10 on the principle of the Kerr effect. The rotation of the plane of polarization is converted to the beam strength by using a beam analyzer and detector to provide read-out information. That film may be a beam addressable storage means when the beam scans the surface of the flim.

The preferred nature of the magneto-optical recording medium is, therefore, (1) the Curie point or the magnetic compensation temperature is low or close to room temperature so that the recording laser power may be low, and (2) the Kerr effect rotation is large so that high reproducing signal or high signal-to-noise ratio is obtained.

A conventional beam addressable file by a ferromagnetic film with an easy magnetization axis in the depth direction is a polycrystal metal thin film like MnBi, an amorphous metal thin film like Gd-Co, Gd-Fe, Tb-Fe, Dy-Fe, and compound single crystal thin film like GIG.

A polycrystal metal thin film like MnBi which stores information by using the Curie point effect has high coercive force (about 5 kilo Oe at room temperature) which is advantageous as a recording medium, however, it has the disadvantage that it needs high power for storing information since the Curie point is high (the Curie point Tc of MnBi is Tc=360° C.). Further, it is difficult to produce a film with precise ratio of compositions.

An amorphous metal thin film like Gd-Co, Gd-Fe et al which stores information by using magnetic compensation temperature has the advantages that it can be produced on any substrate, and the magnetic compensation temperature can be adjusted by including some impurities. However, it has the disadvantages that the coercive force at room temperature is small (300–500 Oe), and therefore, the stored signal might be unstable. Further, it is difficult to produce a film since the composition ratio must be controlled very accurately (1 atom % or less).

A compound single crystal thin film like GIG has the disadvantage that the producing cost is considerably high.

An amorphous alloy thin film TbFe or DyFe which includes Tb or Dy by 15–30 atom % has been proposed for overcoming the above disadvantages, and has the following advantages.

(1) It has an easy magnetization axis perpendicular to the film surface, and coercive force higher than 5 kilo or 6 kilo Oe at room temperature, therefore, high density recording is possible, and the stored data is stable and reliable.

(2) It has high coercive force, therefore, a desired shape of magnetic domain can be written.

(3) An excellent recording medium with high coercive force is obtained with wide range of composition ratio. Therefore, the composition ratio control is not severe, and the producing process is simple and the producing yield rate can be high.

(4) The Curie point is low (120° C. for TbFe, and 60° C. for DyFe), therefore, a small amount of power is enough to store information by using Curie point principle.

However, an amorphous alloy thin film like TbFe or DyFe has the disadvantage that the S/N (signal to noise ratio) in reading out stored information optically, because of low Curie point. FIG. 1A and FIG. 1B show optical reproduced signal level S (FIG. 1A), and S/N (FIG. 1B), in optically reading out signal in an amorphous alloy thin film, where the horizontal axis shows laser power $I_0$ (mili-watt) illuminating the film. It is noted in FIGS. 1A and 1B that TbFe and DyFe which are excellent as a recording medium are worse in optical reading than GdFe which is not as good as TbFe and DyFe in optical recording. The inferior reading out characteristics come from a low Curie point, that is to say, when a laser power $I_0$ in the reproducing phase is too high, the stored information itself is broken by said high reproducing laser beam, and thus, the S/N is deteriorated. That disadvantage of worse reading characteristics of TbFe and DyFe is a key disadvantage as a magneto-optical memory.

Ternary thin films, like GdTbFe, GdDyFe, TbFeCo, and/or DyFeCo have been proposed for solving the above disadvantages. Those ternary thin films have the nature that they have better reading out characteristics than that of binary film like TbFe or DyFe, because of large Kerr rotation angle of ternary films. However, those three elements films have the disadvantage that the Curie point is high and they need high power for recording information.

As mentioned above, a conventional recording medium does not satisfy recording characteristics and reading characteristics simultaneously.

SUMMARY OF THE INVENTION

It is an object of the present invention to overcome the disadvantages and limitations of a prior magneto-optical recording medium by providing a new and improved magneto-optical recording medium.

It is also an object of the present invention to provide a magneto-optical recording medium which has both excellent recording characteristics and excellent reading characteristics.

According to the present invention, a heavy rare earth element in a conventional magneto-optical recording medium (which is an alloy of heavy rare earth element and iron) is substituted in a light rare earth element by a predetermined ratio. The present medium is an amorphous thin film with easy magnetization axis perpendicular to film surface having a chemical formula $(R_zA_{1-z})_xFe_{1-x}$, or $[(R_zA_{1-z})_yB_{1-y}]_xFe_{1-x}$, where R is a light rare earth elements, A and B are heavy rare earth element, and atom ratios satisfy $0.15 \leq x \leq 0.35$, $0.00 < y < 1.00$ and $0.00 < z < 1.00$.

BRIEF DESCRIPTION OF THE DRAWINGS

The foregoing and other objects, feature, and attendant advantages of the present invention will be appreciated as the same become better understood by means of the following description and accompanying drawings wherein.

DESCRIPTION OF THE PREFERRED EMBODIMENTS

The present magneto-optical recording medium has an easy magnetization axis perpendicular to a film surface, a Curie point between 100° C. and 250° C., and has one of the following chemical formulas.

$$(R_zA_{1-z})_xFe_{1-x} \quad (1)$$

where $0.15 \leq x \leq 0.35$, $0.00 < z < 1.00$ $$[(R_zA_{1-z})_yB_{1-y}]_xFe_{1-x} \quad (2)$$

where $0.15 \leq x \leq 0.35$, $0.00 < y < 1.00$, and $0.00 < z < 1.00$
In the above formulas, R is a light rare earth element, A and B are heavy rare earth elements, and x, y and z show atom ratio (atom %). Some of the light rare earth elements are La, Ce, Pr, Nd, Pm, Sm, and Eu, and some of the heavy rare earth elements A and B are Gd, Tb, Dy and Ho.

The examples of the preferable recording medium according to the present invention are SmTbFe, SmDyFe, SmGdFe, SmTbGdFe, and SmTbDyFe, in which a heavy rare earth element of a prior magneto-optical recording medium is substituted by Sm, where indication of atom % is omitted.

In order to provide magnetic anisotropy so that an easy magnetization axis is perpendicular to film surface, the thin film must be amorphous. The amorphous film can be produced by producing a thin film by sputtering or vacuum deposition process on a substrate with lower temperature than room temperature. It is preferable that the thickness of a film is thicker than 100 Å in order to direct each magnetization axis in the depth direction of a film (perpendicular to film surface). Of course, the atom ratio of light rare earth elements, heavy rare earth elements, and Fe (iron) must be in the range shown by said formulas. When the above conditions are satisfied, a very high density recording is possible.

The present magneto-optical recording medium has the nature that it has larger Kerr rotation angle than that of a prior medium, without raising Curie point.

Figure 1A:
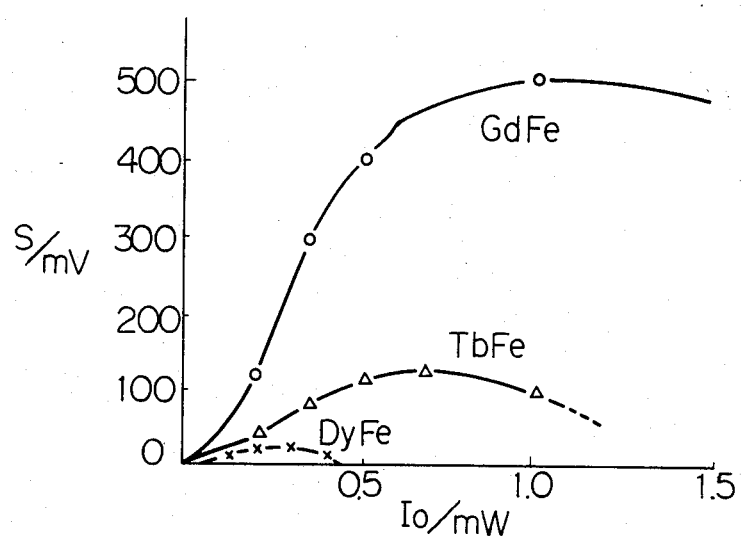
FIG. 1A and FIG. 1B show optical reading characteristics of prior amorphous alloy thin films.
Figure 1B:
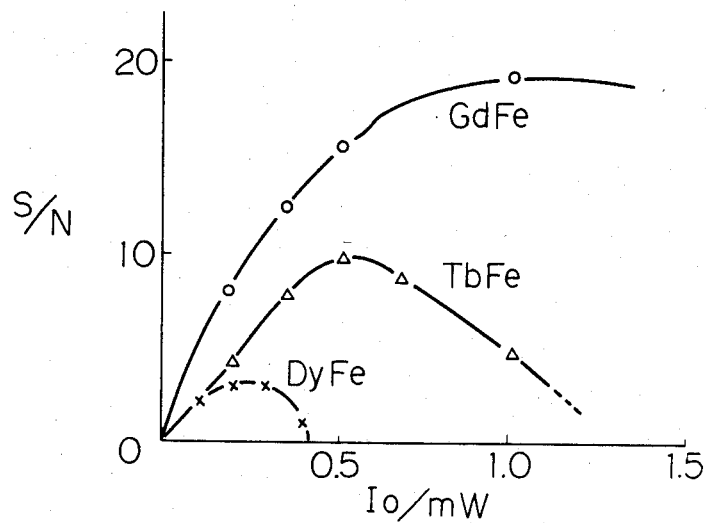
Figure 2:
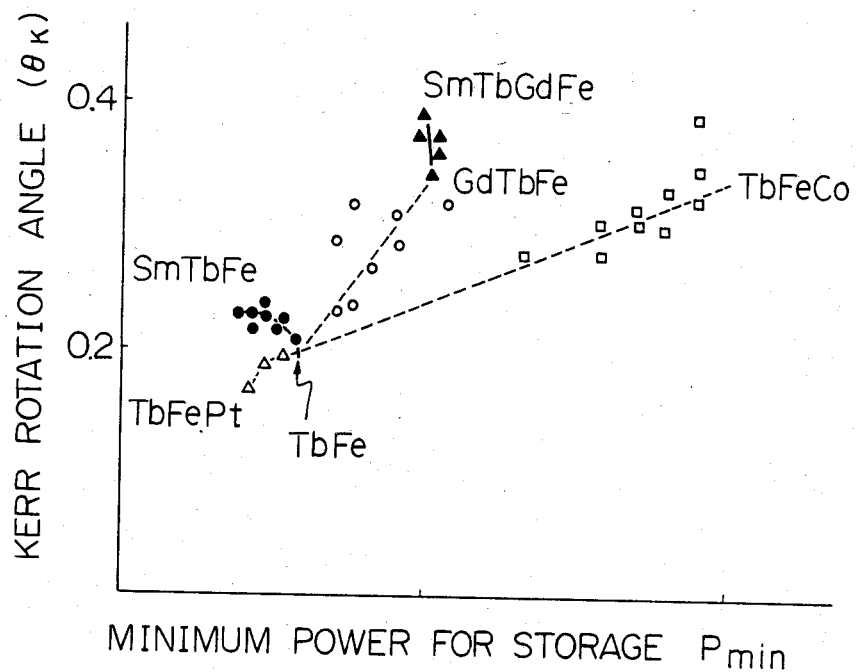
FIG. 2 shows curves between minimum recording power ($P_{min}$, horizontal axis) and Kerr rotation angle ($\theta_k$, vertical axis) with the parameter of atom percent of SmTbFe, SmTbGdFe, GdTbFe, TbFeCo, and TbFePt.
Figure 3:
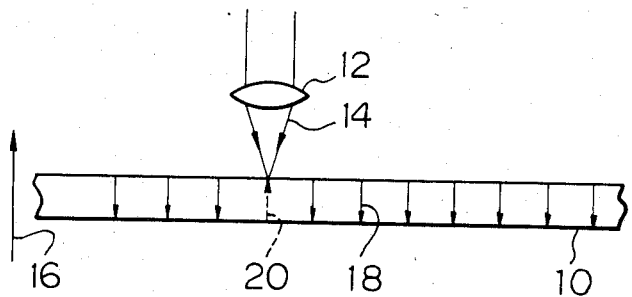
FIG. 3 shows the principle of the magneto-optical recording for the easy understanding of the present invention.

Some of the experimental results of $(Sm_zTb_{1-z})_xFe_{1-x}$, and $[(Sm_zTb_{1-z})_yGd_{1-y}]_xFe_{1-x}$ with the parameter of atom percent of x, y and z are shown in the tables 1 and 2, and FIG. 2, where the minimum recording power $P_{min}$ (horizontal axis), and Kerr rotation angle $\theta$ (vertical axis) are shown.

TABLE 1

| $(Sm_zTb_{1-z})_xFe_{1-x}$ | | | | | |
|---|---|---|---|---|---|
| x | 0.24 | 0.23 | 0.22 | 0.23 | 0.25 |
| z | 0.06 | 0.08 | 0.21 | 0.24 | 0.31 |
| $\theta$ | 0.21 | 0.22 | 0.22 | 0.23 | 0.24 |
| $P_{min}$ (mW) | 3.0 | 2.7 | 2.6 | 2.5 | 2.4 |
| | | | | | (thickness is 1500Å) |

TABLE 2

| $[(Sm_zTb_{1-z})_yGd_{1-y}]_xFe_{1-x}$ | | | | |
|---|---|---|---|---|
| x | 0.23 | 0.23 | 0.20 | 0.21 |
| y | 0.60 | 0.59 | 0.58 | 0.57 |
| z | 0.10 | 0.15 | 0.22 | 0.26 |
| $\theta_k$ | 0.36 | 0.37 | 0.38 | 0.39 |
| $P_{min}$ (mW) | 5.1 | 5.2 | 4.8 | 4.9 |
| | | | | (thickness 1500Å) |

In an experiment of FIG. 2, the results are shown by the relative value with the reference value of Kerr rotation angle $\theta_k = 0.2°$ of TbFe. In case of SmTbFe (table 1), the Kerr rotation angle $\theta_k$ increases, and the minimum recording power $P_{min}$ which is supposed to be proportional to the Curie point decreases, as the substitution of Tb by Sm increases. In case of SmTbGdFe (table 2), $\theta_k$ increases as the substitution by Sm increases, but $P_{min}$ is almost constant.

It should be appreciated in FIG. 2 that in case of a prior recording medium (TbFe, TbFePt, GdTbFe, and TbFeCo), when the ratio of the elements in the medium is adjusted, the Kerr rotation angle increases as the minimum recording power increases. On the other hand, in case of the present recording medium (SmTbFe, and SmTbGdFe), the Kerr rotation angle increases while the minimum recording power decreases. Therefore, the present recording medium is excellent with low recording power in the recording phase and high Kerr rotation angle in reproducing phase.

The present recording medium is an alloy of heavy rare earth element and iron with substitution of said heavy rare earth element by light rare earth element by the ratio between 6% and 31% (see the value z in the table 1).

As mentioned above, the present magneto-optical recording medium improves the optical reading characteristics without deteriorating optical writing characteristics.

As a modification of the present invention, SmTbFeCo, or SmDyFeCo in which a heavy rare earth element of conventional TbFeCo and DyFeCo is substituted by a light rare earth element may have the similar effect to that of the present embodiments.

The present recording medium has an easy magnetization axis perpendicular to a film surface, a large coercive force at room temperature, the Curie point close to room temperature, and has the feature that the producing process is simple, as a conventional recording medium does. Further, the present recording medium has the advantage that the optical reproducing output level is higher than that of a conventional medium. Accordingly, when the present medium is used as a beam addressable magneto-optical recording memory, in which a signal is stored by using an optical beam, and is read out by using the Kerr effect, a very high density memory which provides a high S/N is obtained. The storing process of a signal to a medium is not restricted to an optical beam, but other process using a needle magnetic head, a thermal pen, or electron beam for generating a reversed magnetic domain as possible.

From the foregoing, it will now be apparent that a new and improved magneto-optical recording medium has been found. It should be understood of course that the embodiments disclosed are merely illustrative and are not intended to limit the scope of the invention. Reference should be made to the appended claims, therefore, rather than the specificaiton as indicating the scope of the invention.

What is claimed is:

1. A magneto-optical recording medium using an amorphous thin film having an easy magnetization axis perpendicular to the film surface, wherein the chemical formula of said medium is:

$$(Sm_zA_{1-z})_xFe_{1-x}$$

where A is a heavy rare earth element, and wherein the following atom ratio is satisfied:

$$0.15 \leq x \leq 0.35, 0.06 < z < 0.31.$$

2. A magneto-optical recording medium comprising an amorphous thin film having an easy magnetization axis perpendicular to the film surface, wherein the chemical formula of said medium is:

$$[(Sm_zA_{1-z})_yB_{1-y}]_xFe_{1-x}$$

where A and B are heavy rare earth elements, and wherein the following atom ratio is satisfied:

$$0.15 \leq x \leq 0.35, 0.57 \leq y, 0.10 < z < 0.26.$$

3. A magneto-optical recording medium according to claim 1, wherein said heavy rare earth element is selected from the group consisting of Gd, Tb, Dy and Ho.

4. A magneto-optical recording medium according to claim 2, wherein said heavy rare earth element is selected from the group consisting of Gd, Tb, Dy and Ho.

5. A magneto-optical recording medium according to claim 2, wherein $y \leq 0.60$.

* * * * *